United States Patent [19]
Emmons

[11] Patent Number: 5,381,887
[45] Date of Patent: Jan. 17, 1995

[54] CONVEYOR SYSTEMS AND HIGH DURABILITY ROLLERS THEREFOR

[75] Inventor: Orlin W. Emmons, Wagner, Okla.

[73] Assignee: Elastomer Specialties, Inc., Broken Arrow, Okla.

[21] Appl. No.: 180,875

[22] Filed: Jan. 12, 1994

[51] Int. Cl.$^6$ .............................................. B65G 15/68
[52] U.S. Cl. ...................................... 198/830; 198/843; 193/37
[58] Field of Search ............... 198/842, 843, 780, 830; 193/37

[56] References Cited

U.S. PATENT DOCUMENTS

| | | | |
|---|---|---|---|
| 3,661,246 | 5/1972 | Faunce et al. | 198/806 |
| 3,682,294 | 8/1972 | Milek | 198/808 |
| 3,711,912 | 1/1973 | Teske et al. | 198/843 |
| 3,775,821 | 12/1973 | Somerville | 198/780 |
| 3,786,549 | 1/1974 | Pott | 198/843 |
| 3,797,082 | 3/1974 | Brunes | 198/780 |
| 3,853,214 | 12/1974 | Vinarcsik et al. | 198/780 |
| 3,894,323 | 7/1975 | Hamlen | 198/780 |
| 3,988,045 | 10/1976 | Coutant | 198/780 |
| 4,032,002 | 6/1977 | Jackson | 198/808 |
| 4,034,837 | 7/1977 | Vinarcsik et al. | 198/780 |
| 4,167,997 | 9/1979 | Revells | 198/780 |
| 4,312,444 | 1/1982 | Mushovic | 198/780 |
| 4,440,295 | 4/1984 | Blackwood-Murray et al. | 198/843 |
| 4,448,302 | 5/1984 | Weaver et al. | 198/780 |
| 4,577,747 | 3/1986 | Martin | 198/780 |
| 4,645,071 | 2/1987 | Faulkner et al. | 198/842 |
| 4,913,279 | 4/1990 | Tonissen | 198/806 |
| 4,934,514 | 6/1990 | Flaugher et al. | 198/780 |

Primary Examiner—H. Grant Skaggs
Assistant Examiner—Carol L. Druzbick
Attorney, Agent, or Firm—Dougherty, Hessin, Beavers & Gilbert

[57] ABSTRACT

An inventive roller and an inventive conveyor assembly which includes at least one such roller. The inventive roller comprises: an axle housing; a polymer foam segment positioned around the axle housing; and a polymer coating which covers the exterior of the polymer foam segment.

20 Claims, 3 Drawing Sheets 5,381,887

CONVEYOR SYSTEMS AND HIGH DURABILITY ROLLERS THEREFOR

FIELD OF THE INVENTION

The present invention relates to conveyor belt systems and to rollers used in conveyor belt systems and in other types of conveyor systems.

BACKGROUND OF THE INVENTION

A need presently exists for conveyor system rollers which are durable, impact-resistant, and lightweight. A need also exists for conveyor systems which include such rollers.

SUMMARY OF THE INVENTION

The present invention provides a roller comprising: an elongate central member; a polymer foam segment positioned around the elongate central member; and a polymer coating. The foam segment has a first end, a second end, and an exterior surface which extends from the first end to the second end. The polymer coating covers the exterior surface of the foam segment. The foam segment is preferably a polyurethane foam segment. Additionally, the polymer coating is preferably a polyurethane coating.

The present invention also provides a conveyor assembly comprising: a plurality of rollers; a plurality of frames, each of the frames having at least one of the rollers rotably mounted therein; and a conveyor belt positioned on the rollers. At least one of the rollers comprises: an elongate central member; a polymer foam segment positioned around the elongate central member; and a polymer coating. The foam segment has a first end, a second end, and an exterior surface which extends from the first end to the second end. The polymer coating covers the exterior surface of the foam segment.

The inventive rollers are useful in generally all types of conveyor systems. The inventive rollers are particularly useful as troughed bed training idlers and as belt return idlers in belt-type conveyor systems.

The inventive rollers are lightweight, strong, and durable and are highly impact-resistant and impact-absorbent. When used, for example, in a belt-type conveyor system, the inventive rollers are highly resistant to the stresses and impacts caused by shifting cargo and by objects being loaded and/or dropped onto the conveyor system. Consequently, in comparison to rollers of the type heretofore used in the art, the inventive rollers are much less likely to become dented and/or fractured when exposed to such stresses and impacts. Additionally, the impact-absorbent nature of the inventive rollers operates to reduce the amount of impact stress which would otherwise be borne by the bearings positioned inside the rollers. Further, when used in a belt-type conveyor system, the lightweight nature of the inventive rollers reduces the horsepower required for pulling the conveyor belt and for operating the conveyor system.

Further objects, features, and advantages of the present invention will be readily apparent to those skilled in the art upon reference to the accompanying drawings and upon reading the following description of the preferred embodiments.

DESCRIPTION OF THE PREFERRED EMBODIMENTS

Figure 1:
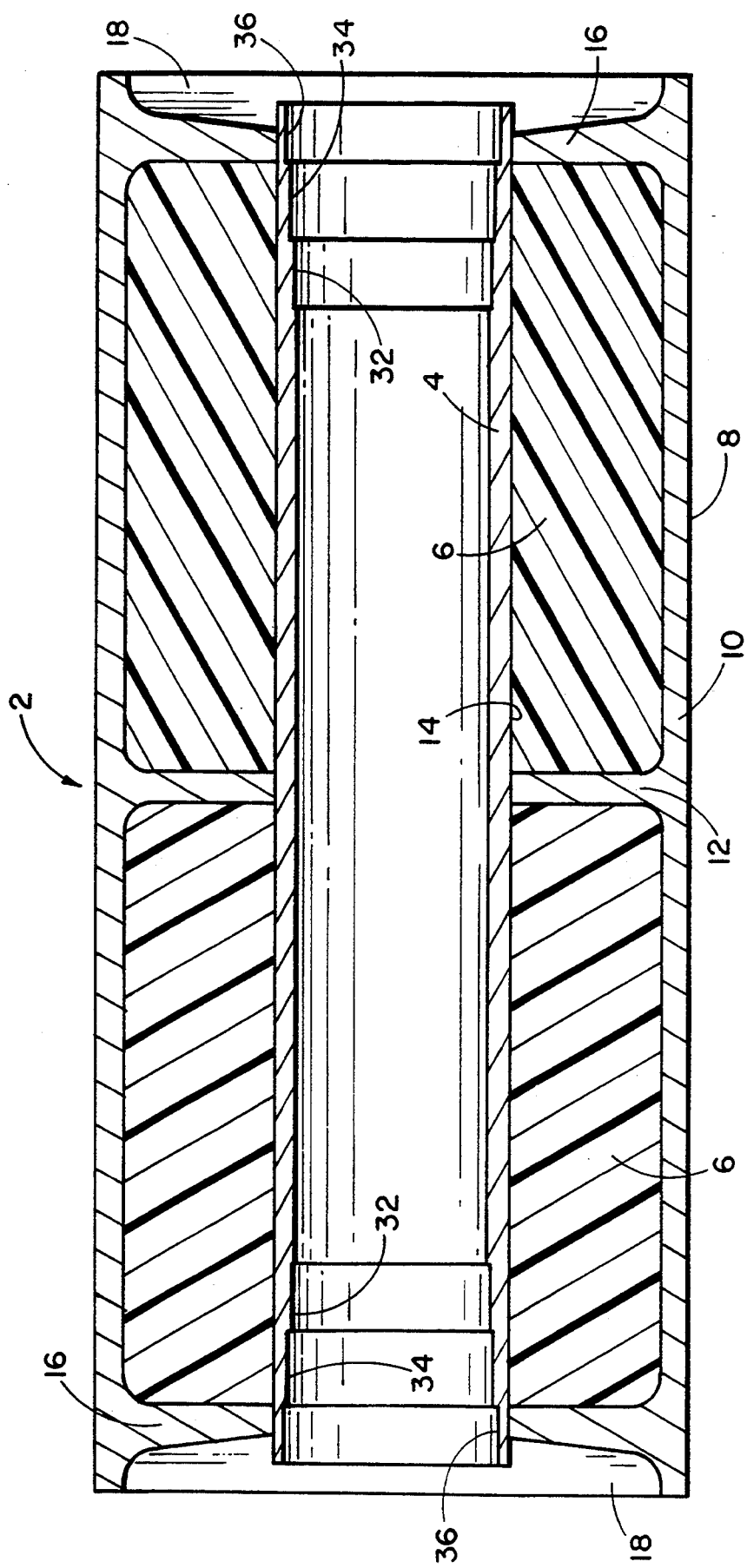
FIG. 1 provides a cutaway elevational side view of an embodiment 2 of the inventive roller provided by the present invention.

Inventive roller 2 comprises: an elongate axle housing 4; two polymer foam segments 6 positioned around axle housing 4; and a polymer coating 8 which covers both of polymer foam segments 6. Polymer foam segments 6 are preferably slightly spaced apart on axle housing 4. Polymer coating 8 preferably includes: an outer portion 10 which covers the outer cylindrical surfaces of polymer foam segments 6; a radial web portion 12 which extends between foam segments 6 from outer portion 10 to the outer cylindrical surface 14 of axle housing 4; end portions 16 which cover the outer ends of foam segments 6 and extend from outer portion 10 to the exterior cylindrical surface 14 of axle housing 4; and concave end portions 18 which preferably extend beyond the ends of axle housing 4.

Figure 2:
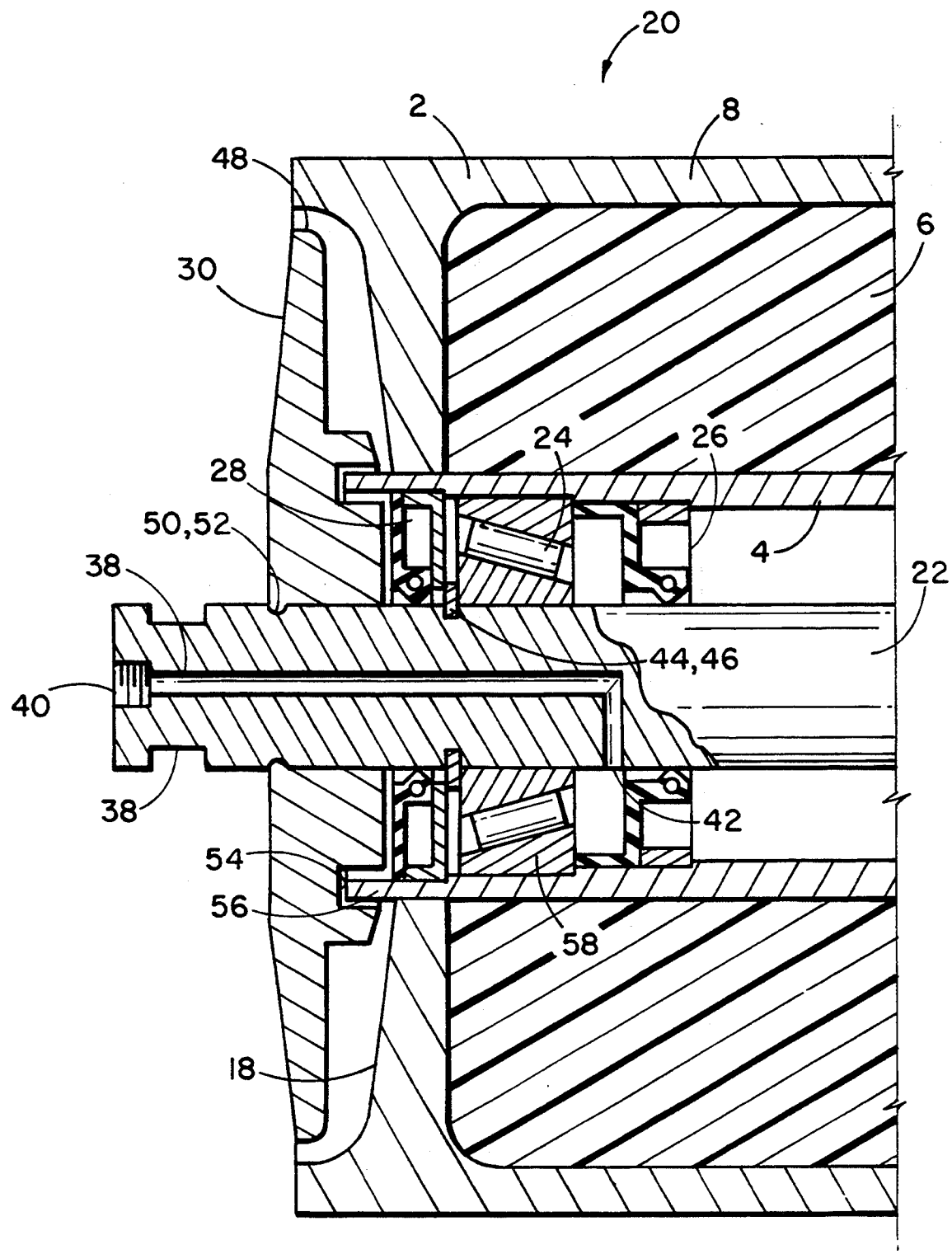
FIG. 2 provides a cutaway elevational side view of an end portion of a roller assembly 20 comprising inventive roller 2 rotatably positioned on an axle 22.

As depicted in FIG. 2, roller assembly 20 preferably comprises: an axle 22 extending longitudinally through the interior of axle housing 4; a bearing 24 positioned in one end of axle housing 4 and around axle 22 for rotatably mounting roller 2 on axle 22; an inner greased seal 26 positioned adjacent the interior side of bearing 24; an outer greased seal 28 positioned adjacent the exterior side of bearing 24; and a face seal 30 provided on axle 22 near the end thereof such that face seal 30 is positioned primarily inside the concave end portion 18 of roller 2. As will be understood, the other end of roller assembly 20 is identical to the end depicted in FIG. 2 and includes a bearing 24, an inner grease seal 26, an outer grease seal 28, and a face seal 30.

Axle housing 4 is preferably an elongate, tubular, metallic member. For example, axle housing 4 is preferably constructed from aluminum tubing. The cylindrical exterior surface 14 of axle housing 4 is preferably sand blasted to facilitate the bonding of polymer foam segments 6 thereto.

In each end of axle housing 4, a first cylindrical bore 32 is provided for receiving inner grease seal 26, a second cylindrical bore 34 is provided for receiving bearing 24, and a third cylindrical bore 36 is provided for receiving outer grease seal 28. Bore 34 has an inside diameter which is slightly larger than that of bore 32. Bore 36 preferably has an inside diameter which is slightly larger than that of bore 34.

Axle 22 is an elongate cylindrical member which is preferably longer than axle housing 4 such that the ends of axle 22 extend beyond the ends of axle housing 4. Axle 22 is preferably formed from high-tensile steel. Machined flats 38 are provided on the ends of axle 22 for securing roller assembly 20 in an idler frame. Threaded grease zerk taps 40 and grease passages 42 are provided in the ends of axle 22 for lubricating bearings 24. Further, grooves 44 are preferably provided around the ends of axle 22 for receiving snap-on retainer rings 46. Retainer rings 46 operate to retain bearings 24 and inventive roller 2 on axle 22 and to provide a means for indexing axle 22 within assembly 20.

Grease seals 26 and 28 are preferably C/R type grease seals. Grease seals 26 and 28 operate to contain the bearing lubricant around bearings 24. Seals 26 and 28 are preferably installed in the same direction such that excess grease will move to the interior of axle housing 4 and will not blow out outer seals 28.

Face seals 30 are preferably molded from polyurethane or other plastic material. Face seals 30 are preferably placed on the ends of axle 22 such that the face seals 30 are almost entirely contained in the concave ends 18 of roller 2. The outer edges 48 of face seals 30 are preferably rounded to correspond with the shape of the concave ends 18 or roller 2. Face seals 30 also preferably include interior rings 50 which snap into axle grooves 52 when face seals 30 are positioned on axle 22. Further, face seals 30 preferable include circular grooves 54 for receiving the circular ends 56 of axle housing 4. Circular grooves 54 are large enough such that (a) ends 56 of axle housing 4 do not contact the surfaces of grooves 54 and (b) roller 2 is, therefore, free to rotate about axle 22. The positioning of ends 56 of axle housing 4 within face seal grooves 54 provides a labyrinth-type seal arrangement whereby dirt, water, and other contaminants are substantially prevented entering the ends of axle housing 4.

Inventive roller assembly 20 can be assembled, for example, by: (1) press fitting inner bearing seals 26 into cylindrical bores 32 formed in the ends of axle housing 4; (2) press fitting bearing cups 58 into cylindrical bores 34 formed in the ends of axle housing 4; (3) placing axle 22 within axle housing 4; (4) sliding bearings 24 over the ends of axle 22 such that bearings 24 seat in cups 58; (5) placing a snap ring 46 in the snap ring groove 44 provided at one end of axle 22; (6) pulling the snap ring 46 against the bearing 24 installed at that end of the axle housing 4 such that the remaining snap ring 46 can be placed in the groove 44 provided on the other end of axle 22; (7) sliding outer grease seals 28 over the ends of axle 22 and press fitting outer seals 28 into cylindrical grooves 36 provided in the ends of axle housing 4; and (8) snapping face seals 30 into place on the ends of axle 22.

Polymer foam segments 6 are preferably composed of polyurethane foam. Additionally, polymer coating 8 is preferably a polyurethane elastomer coating. Polyurethane foams and coatings are resilient materials which will absorb impacts and bounce back to their original shape. Polyurethane elastomer coatings are also highly abrasion resistant, corrosion resistant, and tear resistant. Thus, the use of polyurethane materials in forming foam segments 8 and coating 10 operates to: (a) extend the lives of the inventive rollers and of the inventive conveyor system and (b) protect and preserve bearings 24. Additionally, as discussed hereinbelow, the properties (e.g., density and elasticity) of the polyurethane materials used in forming foam segments 6 and coating 8 can be readily varied to match the intended service conditions of roller assembly 20. Further, polyurethane coating 8 provides a non-stick finish. Thus, when, for example, inventive roller assemblies 20 are used as return idlers in a conveyor belt system, residue remaining on the carrying surface of the conveyor belt is much less likely to stick to and accumulate on the return rollers.

The polyurethane material used in forming foam segments 6 can be either a rigid polyurethane foam, a flexible polyurethane foam or an intermediate foam. A relatively flexible foam will preferably be used for forming those rollers which will be subjected to severe impacts. Thus, for example, a flexible polyurethane foam will preferably be used in forming the conveyor system rollers which will be positioned at locations wherein material is dumped or loaded onto the conveyor system. A more rigid polyurethane foam material, on the other hand, will typically be used in forming the remainder of the conveyor system rollers. Rigid polyurethane foams provide desirably rigid rollers but are still capable of absorbing substantial impacts.

In forming polyurethane foam, a polyester polyol or a polyether (e.g., polypropylene glycol) is typically treated with a diisocyanate in the presence of a catalyst (e.g., an amine, a tin soap, or an organic tin compound) and water. As the polymer forms, the water reacts with the isocyanate groups to cause crosslinking. The reaction of the water with the isocyanate groups also produces carbon dioxide which causes foaming. Alternatively, a blowing agent (e.g., trifluoromethane or a similar volatile material) can be used to cause foaming.

The density of the polyurethane foam material used herein will generally range from about 2 to about 50 pounds per cubic foot. A higher foam density generally provides increased strength but also increases the weight of the foam product.

Flexible polyurethane foam materials used in the present invention will preferably have molded densities in the range of from about 4 to about 10 pounds per cubic foot. Rigid polyurethane foam materials used in the present invention will preferably have molded densities in the range of from about 3 to about 20 pounds per cubic foot. Rigid polyurethane foam materials used in the present invention will most preferably have molded densities in the range of from about 4 to about 7 pounds per cubic foot.

The molded density of a polyurethane foam product is generally controlled by selecting a prepolymer composition having an appropriate free-rise density. Alternatively, the molded density of a polyurethane foam can be controlled (i.e., increased) by limiting the volume of the product mold such that the closed volume of the mold is less than the free-rise volume of the prepolymer material added thereto.

An example of a commercially available rigid foam material preferred for use in the present invention is Pour-in-Place System 24-83, available from North Carolina Foam Industries, Inc., P.O. Box 1528, Mount Airy, N.C. 27030. The 24-83 System has a free-rise density in the range of from about 4.7 to about 5.3 pounds per cubic foot.

Examples of commercially available flexible polyurethane foam materials preferred for use in the present invention are LC-458 and LC-305. LC-458 and LC-305 are available from Leeco Industries, Inc., 5045 Martin L. King Freeway (Highway 287), Fort Worth, Tex. 76119. LC-458 has a free-rise density of about 8 pounds per cubic foot. LC-305 has a free-rise density of about 5 pounds per cubic foot.

Polyurethane foam segments 6 are preferably premolded and then pressed in place on axle housing 4. Premolded polyurethane foam segments 6 will typically be formed by pouring a urethane prepolymer composition which includes a blowing agent and a curing component into a suitably shaped mold. The resulting molded foam segments can typically be removed from the mold after at least about 10 minutes. Upon removal from the mold, the molded foam segments are typically air-cured at ambient temperature for about 2 days.

Foam segments 6 are preferably bonded to the exterior surface of axle housing 4 using a polyurethane compatible bonding agent. As will be understood by those skilled in the art, numerous polyurethane-compatible bonding agents are commercially available. An example of a commercially available polyurethane-compatible bonding agent preferred for use in the present invention is Thixon 406, available from Whittaker Company.

The density and flexibility/elasticity of polyurethane coating 8 can also be varied to match the end use of roller assembly 20. Polyurethane coating 8 will typically have a Shore hardness rating in the range of from about 10A to about 80D. A lower hardness rating generally indicates a higher degree of elasticity. Thus, when roller 2 is intended for use as a high-impact roller, polyurethane coating 8 will preferably have a Shore hardness rating in the range of from about 70A to about 95A. When, on the other hand, roller 2 is intended for use as a lower-impact or rigid roller, coating 8 will preferably have a Shore hardness rating in the range of from about 80A to about 70D. Desired coating flexibilities/elasticities are typically obtained through the selection of appropriate prepolymers and curing agents.

Polyurethane coatings are typically produced by the reaction of a prepolymer containing isocyanate groups (e.g., toluene diisocyanate or 4,4'-diphenylmethane diisocyanate) with a hydroxyl containing material (e.g., a polyol or a drying oil). Flexible coatings used in the present invention can be formed using, for example, a polyester-toluene diisocyanate prepolymer cured with 4,4' methylene bis orthochloroaniline. Flexible coatings formed from these materials are highly durable and will have hardness ratings of about 80A. Polyurethane coatings used in forming rigid rollers, on the other hand, can be produced using, for example, a polyester-diphenylmethane diisocyanate prepolymer cured with a polyol such as 1,4-butanediol. Rigid coatings formed from these materials are highly durable and typically have Shore hardness ratings of about 95A.

Polyurethane coating 8 is preferably formed on inventive roller 2 by: (a) positioning foam segments 6 on and bonding foam segments 6 to axle housing 4; (b) placing the resulting structure in a precision mold; (c) mixing the coating prepolymer and curing agent components and pouring the resulting mixture into the mold; (d) precuring the coating material in the mold at about 230° F. for from about 30 minutes to about 1 hour; and (e) removing the resulting coated product from the mold and post curing the coated product at about 212° F. for about 16 hours.

The size, density, and number of foam segments 6 used in forming inventive roller 2 will generally be determined by: (a) the overall diameter and length of the finished roller product; (b) the desired weight of the roller product; and (c) the desired strength and impact resistance of the roller product. The use of longer foam segments will desirably reduce the overall weight and cost of roller 2. However, the use of longer foam segments provides less contact between coating 8 and axle housing 4 and thus reduces the overall structural strength of roller 2.

Inventive roller 2 will typically be from about 8 inches to about 80 inches in length and will typically have an outside diameter in the range of from about 4 inches to about 7 inches. The foam segments used for forming such rollers will preferably have lengths in the range of from about 6 inches to about 10 inches. Additionally, foam segments 6 will preferably be spaced apart on axle housing 4 such that the radial webs 12 formed therebetween have thicknesses of at least about ⅜ inch. End portions 16 of coating 8 will preferably have thicknesses of at least about ¼ inch. End portions 16 will most preferably have thicknesses of about ⅜ inch.

Face seal 30 is also preferably formed from polyurethane. Face seal 30 is most preferably formed from a rigid polyurethane material of the type described hereinabove having a Shore hardness rating of about 95A.

Figure 3:
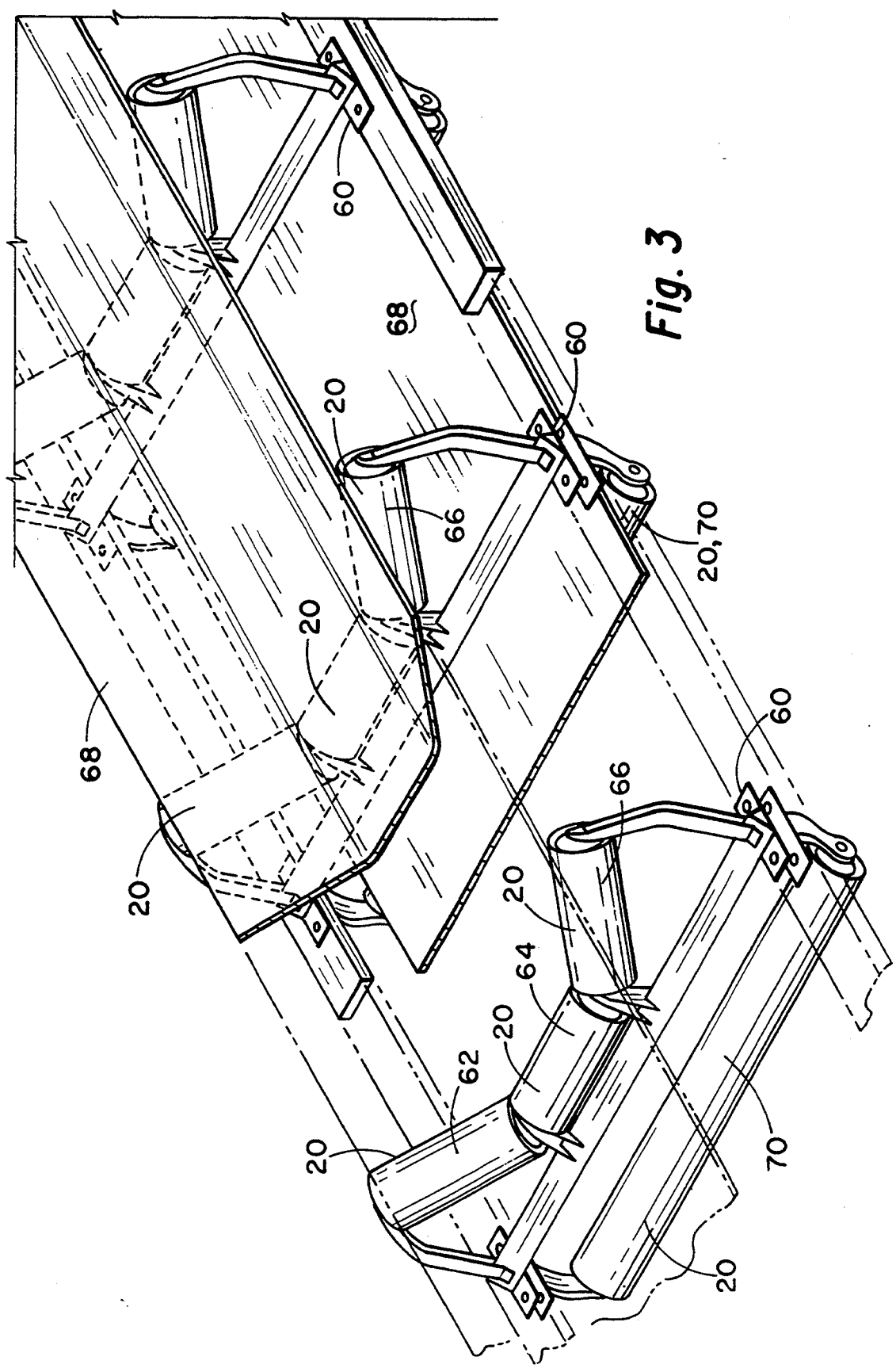
FIG. 3 provides a perspective view of an embodiment of the inventive conveyor assembly.

An inventive conveyor belt system incorporating invented roller assemblies 20 is depicted in FIG. 3. As shown in FIG. 3, three of the inventive roller assemblies 20 are rotatably mounted in the top of a frame 60. The roller assemblies mounted on top of frame 60 are labeled as rollers 62, 64, and 66. These roller assemblies operate as troughing idlers for training conveyor belt 68 in a troughed position. A fourth inventive roller assembly 70 is rotatably mounted in the bottom of frame 60. Roller assembly 70 operates as a return idler for belt 68.

As will be understood by those skilled in the art, the inventive conveyor system operates such that material is loaded and conveyed by the troughed portion of belt 68 supported on rollers 62, 64, and 66. After dumping, belt 68 is carried back to the loading point by return idlers 70.

Thus, the present invention is well adapted to carry out the objects and attain the ends and advantages mentioned above as well as those inherent therein. while presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A roller comprising:
    an elongate central member having a first end, a second end, a passageway extending therethrough from said first end to said second end, and an exterior surface;
    a first polymer foam segment positioned around said elongate central member, said first foam segment having a first end, a second end, an interior surface which extends between said first and said second ends of said first foam segment, and an exterior surface which extends from said first end of said first foam segment to said second end of said first foam segment; and
    a polymer coating covering substantially all of said first foam segment except for said interior surface, said polymer coating having an outside portion covering said exterior surface of said first foam segment and said polymer coating having a first end portion covering said first end of said first foam segment, said first end portion of said polymer coating extending from said outside portion to said exterior surface of said elongate central member;
    wherein said interior surface of said first foam segment directly contacts said exterior surface of said elongate central member.

2. The roller of claim 1 wherein said first polymer foam segment is a polyurethane foam segment.

3. The roller of claim 1 wherein said polymer coating is a polyurethane coating.

4. The roller of claim 1 wherein said polymer coating has a second end portion which extends from said outside portion of said coating to said exterior surface of said elongate central member and covers said second end of said first foam segment.

5. The roller of claim 1 wherein:
said roller further comprises a second polymer foam segment positioned around said elongate central member and spaced apart from said first polymer foam segment;
said second polymer foam segment has a first end, a second end, an interior surface which extends between said first and second ends of said second foam segment, and an exterior surface which extends from said first end of said second foam segment to said second end of said second foam segment;
said first end of said second foam segment is positioned adjacent to and spaced apart from said second end of said first foam segment;
said polymer coating covers substantially all of said second foam segment except for said interior surface of said second foam segment;
said interior surface of said second foam segment directly contacts said exterior surface of said elongate central member;
said outside portion of said polymer coating covers said exterior surface of said second foam segment; and
said polymer coating has an intermediate radial portion positioned between said first end of said second foam segment and said second end of said first foam segment, said intermediate radial portion of said polymer coating extending from said outside portion of said coating to said exterior surface of said elongate central member.

6. The roller of claim 1 further comprising an elongate axle extending through said passageway.

7. The roller of claim 6 wherein:
said elongate axle has a first end portion which projects from said first end of said elongate central member;
said roller further comprises a face seal attached to said first end portion of said elongate axle;
said face seal has an exterior side and an interior side;
said interior side of said face seal has a groove formed therein; and
said first end of said elongate central member is received in said groove, said groove being sized such that said first end of said elongate central member does not contact said face seal.

8. The roller of claim 7 further comprising a bearing assembly wherein: said bearing assembly is positioned on said axle, said bearing assembly is spaced apart from said interior side of said face seal, and said bearing assembly is press fit in said passageway.

9. The roller of claim 1 wherein said elongate central member is formed from a metal material.

10. The roller of claim 1 wherein said interior surface of said first foam segment is bonded to said exterior surface of said elongate central member using a bonding agent.

11. A roller comprising:
an elongate central member having an exterior surface;
a first polymer foam segment positioned around said elongate central member, said first foam segment having a first end, a second end, an interior surface extending between said first end and said second end, and an exterior surface extending from said first end to said second end;
a second polymer foam segment having a first end, a second end, an interior surface extending between said first and second ends of said second foam segment, and an exterior surface extending from said first end of said second foam segment to said second end of said second foam segment, said second foam segment being positioned around said elongate central member such that said first end of said second foam segment is positioned adjacent to and spaced apart from said second end of said first foam segment; and
a polymer coating, said polymer coating covering substantially all of said first foam segment except for said interior surface of said first foam segment and said polymer coating covering substantially all of said second foam segment except for said interior surface of said second foam segment,
said interior surfaces of said first and second foam segments being in direct contact with said exterior surface of said elongate central member,
said polymer coating comprising an outer portion which covers said exterior surfaces of said first and second foam segments,
said polymer coating comprising a first end portion covering said first end of said first foam segment, said first end portion of said polymer coating extending from said outer portion to said exterior surface of said elongate central member, and
said polymer coating comprising an intermediate radial portion provided between said second end of said first foam segment and said first end of said second foam segment, said intermediate radial portion extending from said outer portion to said exterior surface of said elongate central member.

12. The roller of claim 11 wherein said first and second foam segments are polyurethane segments and said polymer coating is a polyurethane coating.

13. The roller of claim 11 wherein said elongate central member is formed from a metal material.

14. The roller of claim 11 wherein said interior surfaces of said first and second foam segments are bonded to said exterior surface of said elongate central member using a bonding agent.

15. A conveyor assembly comprising:
a plurality of rollers;
a plurality of frames, each of said frames having at least one of said rollers rotatably mounted therein; and
a conveyor belt positioned on said rollers, wherein said rollers include at least one first roller comprising:
an elongate central member having a first end, a second end, a passageway extending therethrough from said first end to said second end, and an exterior surface;
a first polymer foam segment positioned around said elongate central member, said first foam segment having a first end, a second end, an interior surface extending between said first and second ends of said first foam segment, and an exterior surface extending from said first end of said first foam segment to said second end of said first foam segment; and
a polymer coating covering substantially all of said first foam segment except for said interior surface, said polymer coating having an outside portion covering said exterior surface of said first foam segment and said polymer coating having a first end portion covering said first end of said first foam segment, said first end portion of said polymer coating extending from said outside portion to said exterior surface of said elongate central member;

wherein said interior surface of said first foam segment directly contacts said exterior surface of said elongate central member.

16. The conveyor assembly of claim 15 wherein:

said first roller further comprises a second polymer foam segment positioned around said elongate central member and spaced apart from said first polymer foam segment;

said second polymer foam segment has a first end, a second end, an interior surface which extends between said first and second ends of said second foam segment, and an exterior surface which extends from said first end of said second foam segment to said second end of said second foam segment;

said first end of said second foam segment is positioned adjacent to and spaced apart from said second end of said first foam segment;

said polymer coating covers substantially all of said second foam segment except for said interior surface of said second foam segment;

said interior surface of said second foam segment directly contacts said exterior surface of said elongate central member;

said outside portion of said polymer coating covers said exterior surface of said second foam segment; and said polymer coating has an intermediate radial portion positioned between said first end of said second foam segment and said second end of said first foam segment, said intermediate radial portion of said polymer coating extending from said outside portion of said coating to said exterior surface of said elongate central member.

17. The conveyor assembly of claim 15 wherein:

said rollers further include at least one second roller comprising:

a second roller elongate central member having a first end, a second end, a passageway extending therethrough from said first end of said second roller central member to said second end of said second roller central member, and an exterior surface;

a second roller polymer foam segment positioned around said second roller central member, said second roller foam segment having a first end, a second end, an interior surface extending between said first and second ends of said second roller foam segment, and an exterior surface extending from said first end of said second roller foam segment to said second end of said second roller foam segment; and a second roller polymer coating covering substantially all of said second roller foam segment except for said interior surface of said second roller foam segment, said second roller polymer coating having an outside portion covering said exterior surface of said second roller foam segment and said second roller polymer coating having a first end portion covering said first end of said second roller foam segment, said first end portion of said second roller polymer coating extending from said outside portion of said second roller polymer coating to said exterior surface of said second roller elongate central member;

wherein said interior surface of said second roller foam segment directly contacts said exterior surface of said second roller elongate central member, said first roller is located at a position in said conveyor assembly wherein a material is loaded onto said conveyor belt, said second roller is located at a position in said conveyor assembly wherein said material is carried by said conveyor belt but no material is loaded onto said conveyor belt, said polymer foam segment of said first roller is more flexible than is said second roller polymer foam segment, and said polymer coating of said first roller has a higher degree of elasticity than does said second roller polymer coating.

18. The conveyor assembly of claim 15 wherein said first roller further comprises an elongate axle extending through said passageway.

19. The conveyor assembly of claim 18 wherein:

said elongate axle has a first end portion which projects from said first end of said elongate central member;

said roller further comprises a face seal attached to said first end portion of said elongate axle;

said face seal has an exterior side and an interior side;

said interior side of said face seal has a groove formed therein; and said first end of said elongate central member is received in said groove, said groove being sized such that said first end of said elongate central member does not contact said face seal.

20. The conveyor assembly of claim 15 wherein said elongate central member is formed from a metal material.

* * * * *